(12) United States Patent
Kim et al.

(10) Patent No.: US 10,082,710 B2
(45) Date of Patent: Sep. 25, 2018

(54) LIQUID CRYSTAL DISPLAY DEVICE

(71) Applicant: SAMSUNG DISPLAY CO., LTD., Yongin-si, Gyeonggi-Do (KR)

(72) Inventors: Wonho Kim, Seongnam-si (KR); Sungman Kim, Seongnam-si (KR); Yeonmun Jeon, Hwaseong-si (KR); Youngje Cho, Asan-si (KR); Taehyung Hwang, Seoul (KR)

(73) Assignee: SAMSUNG DISPLAY CO., LTD., Gyeonggi-Do (KR)

( * ) Notice: Subject to any disclaimer, the term of this patent is extended or adjusted under 35 U.S.C. 154(b) by 0 days.

(21) Appl. No.: 15/821,176

(22) Filed: Nov. 22, 2017

(65) Prior Publication Data

US 2018/0095331 A1  Apr. 5, 2018

Related U.S. Application Data

(63) Continuation of application No. 15/049,324, filed on Feb. 22, 2016, now Pat. No. 9,846,338.

(30) Foreign Application Priority Data

Jun. 8, 2015 (KR) .................. 10-2015-0080457

(51) Int. Cl.
*G02F 1/1343* (2006.01)
*G02F 1/1368* (2006.01)
*G02F 1/1362* (2006.01)

(52) U.S. Cl.
CPC ...... *G02F 1/134309* (2013.01); *G02F 1/1368* (2013.01); *G02F 1/13439* (2013.01); *G02F 1/134363* (2013.01); *G02F 1/136286* (2013.01)

(58) Field of Classification Search
CPC ......... G02F 1/134309; G02F 1/134363; G02F 1/136286; G02F 1/13439; G02F 1/1368
See application file for complete search history.

(56) References Cited

U.S. PATENT DOCUMENTS 6,809,789 B2  10/2004  Kim et al.
8,314,914 B2  11/2012  Ko et al.
8,804,081 B2   8/2014  Song et al.
(Continued)

FOREIGN PATENT DOCUMENTS

KR  1020110070475 A  6/2011
KR  1020120081666 A  7/2012

*Primary Examiner* — Donald Raleigh
(74) *Attorney, Agent, or Firm* — Cantor Colburn LLP

(57) ABSTRACT

A liquid crystal display device includes: a first substrate and a second substrate opposite to the first substrate; a liquid crystal layer between the first substrate and the second substrate; a gate line extending in a first direction on the first substrate; a data line extending in a second direction intersecting the first direction on the first substrate; a first electric field generating electrode on the first substrate; and a second electric field generating electrode on the first substrate, wherein the second electric field generating electrode includes a stem electrode extending in parallel to the data line and branch electrodes extending from the stem electrode forming a predetermined angle with respect to the gate line, and an interval between the stem electrode and a data line adjacent thereto differs from an interval between the branch electrodes and a data line adjacent thereto.

20 Claims, 9 Drawing Sheets

(56) References Cited

U.S. PATENT DOCUMENTS

| | | | |
|---|---|---|---|
| 2009/0279010 A1* | 11/2009 | Kim | G02F 1/133753 349/46 |
| 2013/0258226 A1 | 10/2013 | Hasegawa et al. | |
| 2015/0009465 A1* | 1/2015 | Park | G02F 1/133707 349/139 |
| 2015/0035741 A1* | 2/2015 | Lee | G02F 1/136227 345/103 |
| 2015/0036073 A1* | 2/2015 | Im | G02F 1/1333 349/48 |
| 2015/0070644 A1 | 3/2015 | Lee et al. | |
| 2015/0331289 A1 | 11/2015 | Lee et al. | |
| 2016/0109768 A1* | 4/2016 | Yu | H01L 27/1225 257/72 |

\* cited by examiner

LIQUID CRYSTAL DISPLAY DEVICE

This application is a continuation of U.S. patent application Ser. No. 15/049,324, filed on Feb. 22, 2016, which claims priority to Korean Patent Application No. 10-2015-0080457, filed on Jun. 8, 2015, and all the benefits accruing therefrom under 35 U.S.C. § 119, the content of which in its entirety is herein incorporated by reference.

BACKGROUND

1. Field

Embodiments of the invention relate to a liquid crystal display ("LCD") device, and more particularly, to an LCD device with enhanced transmittance.

2. Description of the Related Art

A liquid crystal display ("LCD") device is one of widely used types of flat panel display ("FPD") device in recent. An LCD device typically includes two substrates including electrodes provided thereon and a liquid crystal layer interposed between the two substrates. In such an LCD device, liquid crystal molecules of the liquid crystal layer are rearranged by voltages that are applied to the two electrodes, thereby adjusting the amount of transmitted light and displaying an image on the LCD device.

Despite ease of slimming, LCD devices may have low front visibility as compared to side visibility. To address such issues, various schemes of arranging and driving liquid crystals have been developed. In addition, to provide a wide viewing angle, research is being continuously conducted on an LCD device in a plane to line switching ("PLS") mode in which a pixel electrode and a common electrode are both disposed on a single substrate.

The PLS mode is classified as one of a horizontal slit ("H-slit") mode and a vertical slit ("V-slit") mode. The H-slit mode includes liquid crystals that are aligned in a direction parallel to a short side of a pixel and a direction of a slit of an electrode is parallel to the short side of the pixel. The V-slit mode includes liquid crystals that are aligned in a direction parallel to a long side of a pixel and a direction of a slit of an electrode is parallel to the long side of the pixel.

Since a viewing angle characteristic is determined by an initial alignment direction, the H-slit mode has a wide viewing angle characteristic in a horizontal direction, and the V-slit mode has a wide viewing angle characteristic in a vertical direction. In monitors and LCDs used in vehicles, and the like, a viewing angle characteristic in a horizontal direction may be more significant than that of a viewing angle characteristic in a vertical direction. Thus, the H-slit mode may be effectively applied to monitors and LCDs for vehicles.

SUMMARY

Such an LCD in the horizontal slit ("H-slit") mode as described above has a lower transmittance characteristic than the vertical slit mode since a disclination of liquid crystals may occur in parallel to a long side of a pixel in the H-slit mode while a disclination of liquid crystals occurs in parallel to a short side of a pixel in the V-slit mode.

Embodiments of the invention are directed to a liquid crystal display ("LCD") device with enhanced transmittance.

According to an exemplary embodiment of the invention, a liquid crystal display device includes: a first substrate; a second substrate opposite to the first substrate; a liquid crystal layer between the first substrate and the second substrate; a gate line on the first substrate and extending in a first direction; a data line on the first substrate and extending in a second direction intersecting the first direction; a first electric field generating electrode on the first substrate; and a second electric field generating electrode on the first substrate, the second electric field generating electrode being insulated from the first electric field generating electrode, where the second electric field generating electrode includes a stem electrode extending in parallel to the data line and branch electrodes extending from the stem electrode while having a predetermined angle with respect to the gate line, and an interval between the stem electrode and a data line adjacent to the stem electrode differs from an interval between the branch electrodes and a data line adjacent to the branch electrodes.

In an exemplary embodiment, the interval between the stem electrode and the data line adjacent to the stem electrode may be less than the interval between the branch electrodes and the data line adjacent to the branch electrodes.

In an exemplary embodiment, the first electric field generating electrode may be a planar electrode.

In an exemplary embodiment, the branch electrode may include a pair of edge portions at opposite ends of the branch electrode, respectively, and a center portion between the pair of edge portions.

In an exemplary embodiment, a first angle formed between the edge portion and the gate line may be greater than a second angle formed between the center portion and the gate line.

In an exemplary embodiment, the first angle may be in a range of about 15 degrees to about 30 degrees.

In an exemplary embodiment, the second angle may be in a range of about 10 degrees to about 15 degrees.

In an exemplary embodiment, the pair of edge portions may have a width in a range of about 5 micrometers (μm) to about 10 μm.

In an exemplary embodiment, a shape of the second electric field generating electrode may be symmetric with respect to an imaginary center line parallel to the gate line.

In an exemplary embodiment, the liquid crystal display device may further include a thin film transistor connected to the gate line and the data line.

In an exemplary embodiment, The second electric field generating electrode may be connected to the thin film transistor.

In an exemplary embodiment, The liquid cyrstal layer may include liquid crystal molecules having a major axis initially aligned in parallel to the gate line.

BRIEF DESCRIPTION OF THE DRAWINGS

The above and other features and aspects of the disclosure of invention will be more clearly understood from the following detailed description taken in conjunction with the accompanying drawings, in which.

DETAILED DESCRIPTION

Figure 1:
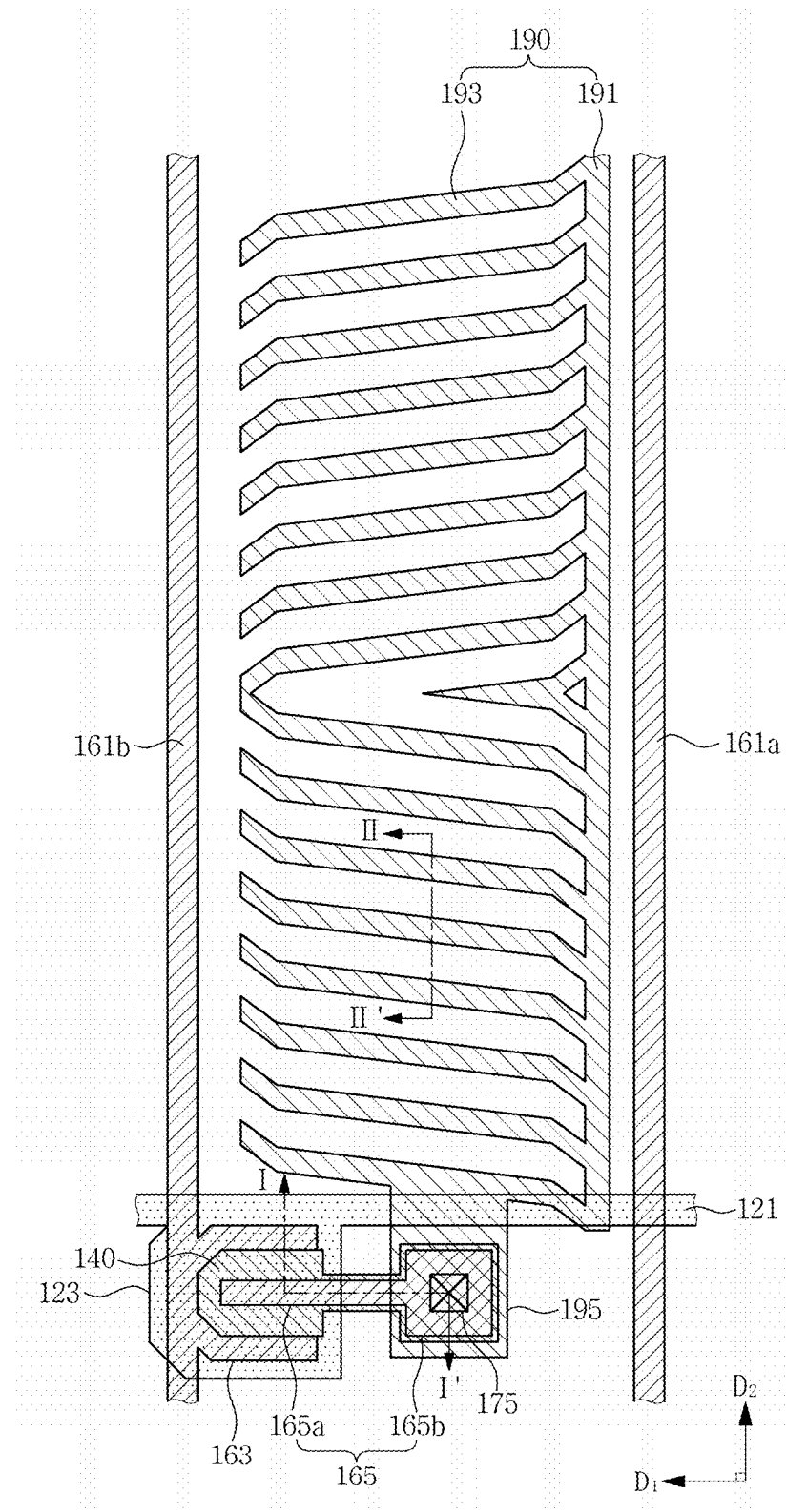
FIG. 1 is a plan view illustrating a pixel of a liquid crystal display ("LCD") device according to an exemplary embodiment.

Exemplary embodiments will now be described more fully hereinafter with reference to the accompanying drawings.

Although the invention can be modified in various manners and have several embodiments, specific embodiments are illustrated in the accompanying drawings and will be mainly described in the specification. However, the scope of the embodiments of the invention is not limited to the specific embodiments and should be construed as including all the changes, equivalents, and substitutions included in the spirit and scope of the invention.

Throughout the specification, when an element is referred to as being "connected" to another element, the element is "directly connected" to the other element, or "electrically connected" to the other element with one or more intervening elements interposed therebetween.

The terminology used herein is for the purpose of describing particular embodiments only and is not intended to be limiting. As used herein, the singular forms "a," "an," and "the" are intended to include the plural forms, including "at least one," unless the content clearly indicates otherwise. "Or" means "and/or." As used herein, the term "and/or" includes any and all combinations of one or more of the associated listed items. It will be further understood that the terms "comprises," "comprising," "includes" and/or "including," when used in this specification, specify the presence of stated features, integers, steps, operations, elements, and/or components, but do not preclude the presence or addition of one or more other features, integers, steps, operations, elements, components, and/or groups thereof It will be understood that, although the terms "first", "second", and the like, may be used herein to describe various elements, components, areas, layers and/or sections, these elements, components, areas, layers and/or sections should not be limited by these terms. These terms are only used to distinguish one element, component, area, layer or section from another element, component, area, layer or section. Thus, a first element, component, area, layer or section discussed below could be termed a second element, component, area, layer or section without departing from the teachings of example embodiments.

Furthermore, relative terms, such as "lower" or "bottom" and "upper" or "top," may be used herein to describe one element's relationship to another elements as illustrated in the Figures. It will be understood that relative terms are intended to encompass different orientations of the device in addition to the orientation depicted in the Figures. For example, if the device in one of the figures is turned over, elements described as being on the "lower" side of other elements would then be oriented on "upper" sides of the other elements. The exemplary term "lower," can therefore, encompasses both an orientation of "lower" and "upper," depending on the particular orientation of the figure. Similarly, if the device in one of the figures is turned over, elements described as "below" or "beneath" other elements would then be oriented "above" the other elements. The exemplary terms "below" or "beneath" can, therefore, encompass both an orientation of above and below.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30 %, 20%, 10%, 5% of the stated value.

When it is determined that a detailed description may make the purpose of the invention unnecessarily ambiguous in the description of the invention, such a detailed description will be omitted. In addition, the same components and corresponding components are given the same reference numeral.

Figure 2:
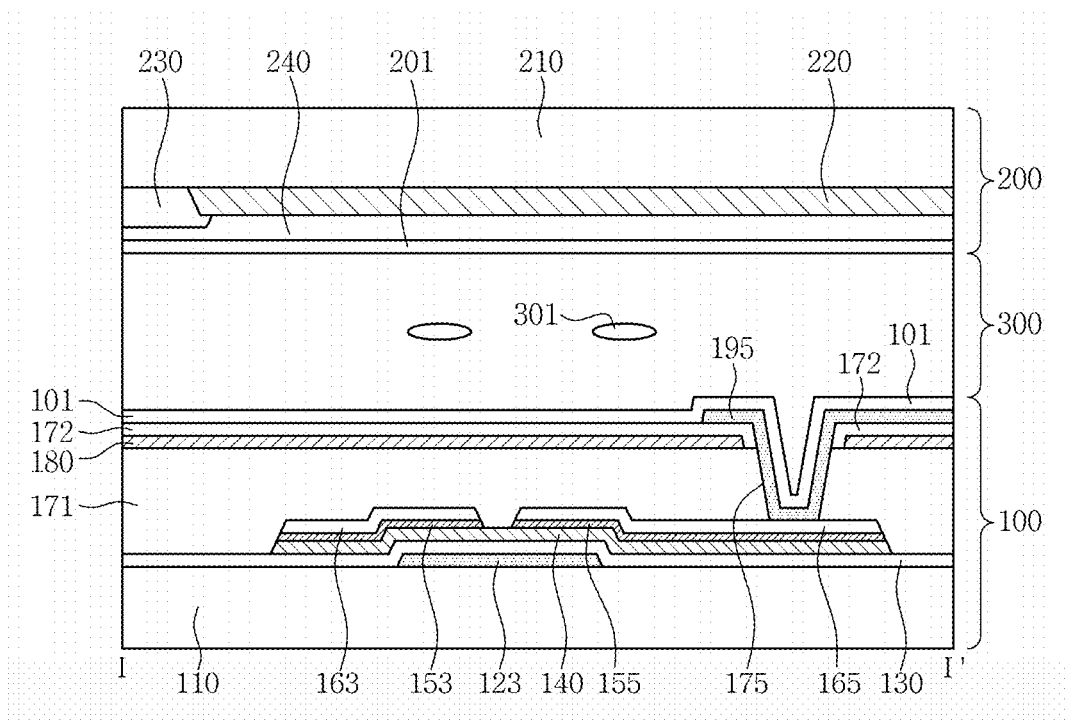
FIG. 2 is a cross-sectional view taken along line I-I' of FIG. 1.
Figure 3:
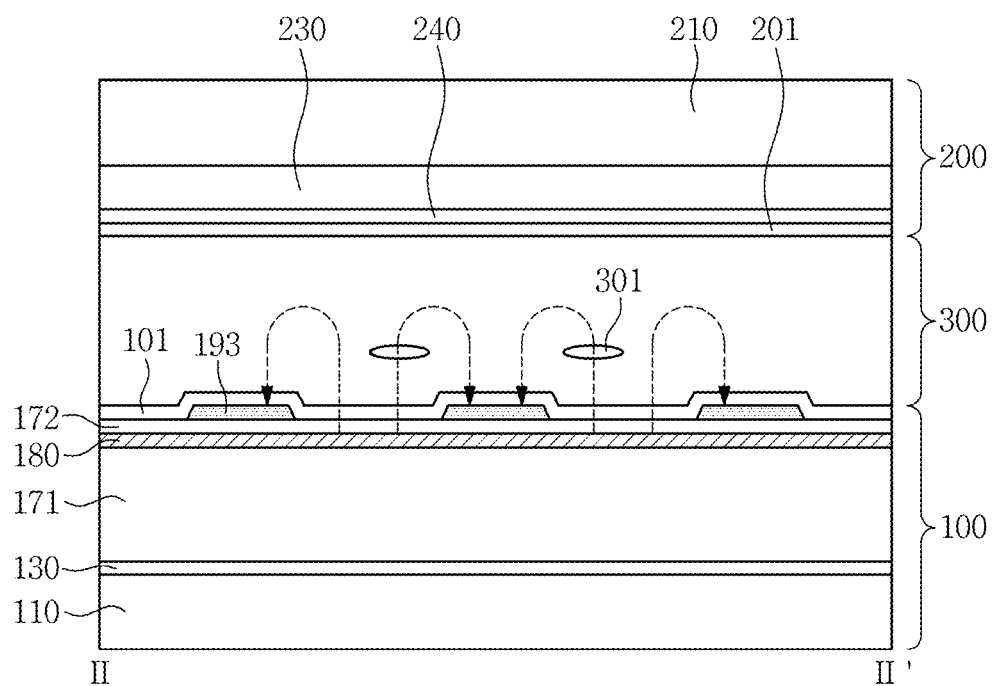
FIG. 3 is a cross-sectional view taken along line II-II' of FIG. 1.

FIG. 1 is a plan view illustrating a pixel of a liquid crystal display ("LCD") device according to an exemplary embodiment. FIG. 2 is a cross-sectional view taken along line I-I' of FIG. 1. FIG. 3 is a cross-sectional view taken along line II-II' of FIG. 1.

Referring to FIGS. 1, 2 and 3, an exemplary embodiment of the LCD device includes a lower display panel 100, an upper display panel 200 opposite to, e.g., facing, the lower display panel 100, and a liquid crystal layer 300 between the lower display panel 100 and the upper display panel 200.

The liquid crystal layer 300 may be filled in a space defined between the lower display panel 100 and the upper display panel 200 and sealed by a sealant (not illustrated). The liquid crystal layer 300 may function as a dielectric body. The liquid crystal layer 300 may be disposed on one of the lower display panel 100 and the upper display panel 200, and is configured to couple the lower display panel 100 and the upper display panel 200 to one another.

The lower display panel 100 and the upper display panel 200 may maintain a cell distance, that is, a cell gap, therebetween in a range of about 2.0 micrometers (μm) to about 5.0 μm by the sealant (not illustrated) or a spacer (not illustrated), for example, in a range of about 3.3 μm to about 3.7 μm.

Polarizers (not illustrated) may be disposed on the lower display panel 100 and the upper display panel 200, respectively, such that respective polarizing axes or respective transmittance axes of the polarizers are substantially perpendicular to the lower display panel 100 and the upper display panel 200. In an exemplary embodiment, the polarizers may be disposed on or below the lower display panel 100 and on or below the upper display panel 200, respectively.

Hereinafter, the lower display panel 100 will be described in detail.

The lower display panel 100 include a first substrate, which is an insulating substrate including or formed of plastic, transparent glass such as soda lime glass or borosilicate glass, or the like, for example.

In the lower display panel 100, gate wirings 121 and 123 that transmit a gate signal are disposed on the first substrate 110.

The gate wirings 121 and 123 may include or be formed of at least one selected from: an aluminum (Al) based metal such as Al or an Al alloy, a silver (Ag) based metal such as Ag or an Ag alloy, a copper (Cu) based metal such as Cu or an Cu alloy, a molybdenum (Mo) based metal such as Mo or a Mo alloy, chromium (Cr), titanium (Ti), and tantalum (Ta).

In an exemplary embodiment, the gate wirings 121 and 123 may have a multilayer structure including a plurality of conductive layers (not illustrated) having different physical properties from each other. In an exemplary embodiment, where the gate wirings 121 and 12 have multilayer structure of two conductive layers, one of the two conductive layers may include a metal having low resistivity, for example, an Al-based metal, an Ag-based metal or a Cu-based metal, to reduce a signal delay or a voltage drop. In such an embodiment, the other of the two conductive layers may include a material having a high contact property with respect to indium-tin oxide ("ITO") and indium-zinc oxide ("IZO"). In one exemplary embodiment, for example, the material of the other of the two conductive layers may include a Mo-based metal, Cr, Ti or Ta.

In one exemplary embodiment, for example, the multilayer structure may have a structure including a Cr lower layer and an Al upper layer, a structure including an Al lower layer and a Mo upper layer, or a structure including a Ti lower layer and a Cu upper layer. However, the invention is not limited thereto, and the gate wirings 121 and 123 may include various metals and conductive materials in an alternative exemplary embodiment.

In an exemplary embodiment, the gate wirings 121 and 123 include a gate line 121 extending in a direction, for example, a first direction D1, and a gate electrode 123 protruding from the gate line 121 to have a protrusion shape.

The gate electrode 123, along with a source electrode 163 and a drain electrode 165, constitute a three-terminal of a thin film transistor.

A gate insulating layer 130 is disposed on the first substrate 110 on which the gate wirings 121 and 123 are disposed. The gate insulating layer 130 may include silicon oxide ($SiO_x$) or silicon nitride ($SiN_x$). In an exemplary embodiment, the gate insulating layer 130 may further include aluminum oxide, titanium oxide, tantalum oxide, or zirconium oxide.

A semiconductor layer 140 is disposed on the gate insulating layer 130. The semiconductor layer 140 may substantially overlap data wirings 161a, 161b, 163, and 165, which are to be described further below. However, the disposition of the semiconductor layer 140 is not limited thereto, and alternatively, the semiconductor layer 140 may only be disposed on a portion of the gate insulating layer 130 that corresponds to the gate electrode 123.

The semiconductor layer 140 may include or be formed of an oxide semiconductor including at least one selected from: amorphous silicon (a-Si), polycrystalline silicon (poly-Si), gallium (Ga), indium (In), tin (Sn), and zinc (Zn).

Ohmic contact layers 153 and 155 are disposed on the semiconductor layer 140. The ohmic contact layers 153 and 155 may enhance a contact property between the semiconductor layer 140, and the source electrode 163 and/or the drain electrode 165 which are to be described further below. The ohmic contact layers 153 and 155 may not be disposed in a channel region between the source electrode 163 and the drain electrode 165.

In one exemplary embodiment, for example, the ohmic contact layers 153 and 155 may include or be formed of amorphous silicon doped with high-concentration n-type impurities (n+a-Si). In an exemplary embodiment, in which a contact property between the semiconductor layer 140, and the source electrode 163 and/or the drain electrode 165 is sufficiently secured, the ohmic contact layers 153 and 155 may be omitted.

The data wirings 161a, 161b, 163, and 165 are disposed on the semiconductor layer 140. The data wirings 161a, 161b, 163, and 165 may include or be formed of the same material as that of the gate wirings 121 and 123 described above.

The data wirings 161a, 161b, 163, and 165 include data lines 161a and 161b, the source electrode 163, and the drain electrode 165. The data lines 161a and 161b may extend in a direction intersecting the gate line 121, for example, a second direction D2.

The source electrode 163 is branched off from the data lines 161a and 161b to extend onto the gate electrode 123. The drain electrode 165 has one end portion 165a facing the source electrode 163 having a bar shape, and another end portion 165b having a relatively wide area, based on the gate electrode 123.

A channel, through which charge is transmitted during the operation of the thin film transistor, is formed within the semiconductor layer 140 between the source electrode 163 and the drain electrode 165.

In an exemplary embodiment, in which the semiconductor layer 140 and the data wirings 161a, 161b, 163, and 165 are provided or formed using the same mask, the data wirings 161a, 161b, 163, and 165 may have substantially the same pattern, except for the channel region, as a pattern of the semiconductor layer 140 which is below the data wirings 161a, 161b, 163, and 165.

A first passivation layer 171 is disposed over an entire surface of a structure obtained subsequent to the formation of the data wirings 161a, 161b, 163, and 165. The first passivation layer 171 may have a monolayer or multilayer structure including such as, for example, silicon oxide ($SiO_x$), silicon nitride ($SiN_x$), a photosensitive organic material, or a low-dielectric-constant insulating material such as a-Si:C:O or a-Si:O:F.

A first electric field generating electrode 180 is formed over an entire surface of the first passivation layer 171. The first electric field generating electrode 180 may be formed of a transparent conductive material such as ITO or IZO.

The first electric field generating electrode 180 receives a common voltage from a common voltage line (not illustrated) disposed outwardly of the first substrate 110. The common voltage line may be provided or formed simultaneously with the gate wirings 121 and 123 during a same process.

A second passivation layer 172 is disposed over an entire surface of a structure obtained subsequent to the formation of the first electric field generating electrode 180. The second passivation layer 172 may include or be formed of the same material as that of the first passivation layer 171.

A second electric field generating electrode 190 is disposed on the second passivation layer 172. The second electric field generating electrode 190 may include or be formed of a transparent conductive material such as ITO or IZO.

A contact hole 175, through which a portion of the drain electrode 165 is exposed, is defined through the first passivation layer 171 and the second passivation layer 172. The second electric field generating electrode 190 receives a data voltage from the drain electrode 165 connected thereto through the contact hole 175.

The second electric field generating electrode 190 includes a stem electrode 191 extending in a direction, for example, the second direction D2, a plurality of branch electrodes 193 extending from the stem electrode 191 while having a predetermined angle with respect to the first direction D1, and a connector 195 branched off from the branch electrode 193.

The plurality of branch electrodes 193 generate horizontal electric fields (indicated by the arrows in FIG. 3), along with the first electric field generating electrode 180 which is a planar electrode. The second electric field generating electrode 190 will be described later in detail.

Hereinafter, the upper display panel 200 will be described in detail.

The upper display panel 200 includes a second substrate 210, which is an insulating substrate including or formed of plastic, transparent glass such as soda lime glass or borosilicate glass, or the like, for example.

In the upper display panel 200, a light blocking member 220 and a color filter 230 are disposed on the second substrate 210.

The light blocking member 220 has an aperture region through which light is transmitted. The light blocking member 220 is referred to as a black matrix, and may define a pixel region. The light blocking member 220 may include a metal such as chromium oxide ($CrO_x$) or an opaque organic layer forming material. In an alternative exemplary embodiment, the pixel region may be defined by the gate line 121 and the data lines 161a and 161b.

The color filter 230 is provided substantially in an area surrounded by the light blocking member 220, and may have one of red, green, blue, cyan, magenta, yellow and white. In an exemplary embodiment, pixels including color filters having three primary colors such as, for example, red, green and blue, or cyan, magenta and yellow, may define a unit pixel group for displaying a color.

An overcoat layer 240 is disposed on the light blocking member 220 and the color filter 230. The overcoat layer 240 may planarize a curved lower surface of the light blocking member 220, the color filter 230, and the like, or effectively prevent the eruption of impure elements from of the layers therebelow, e.g., the light blocking member 220, the color filter 230 and the like.

In an exemplary embodiment, alignment layers 101 and 201 are disposed on inner surfaces of the lower and upper display panels 100 and 200, respectively. The alignment layers 101 and 201 may be a homeotropic alignment layer. An alignment direction of the alignment layers 101 and 201 may be parallel to the first direction D1. Accordingly, liquid crystal molecules 301 of the liquid crystal layer 300 may have a major or longitudinal axis that is initially aligned in a direction parallel to the first direction D1 in a state where no electric field is generated in the liquid crystal layer 300.

Figure 4:
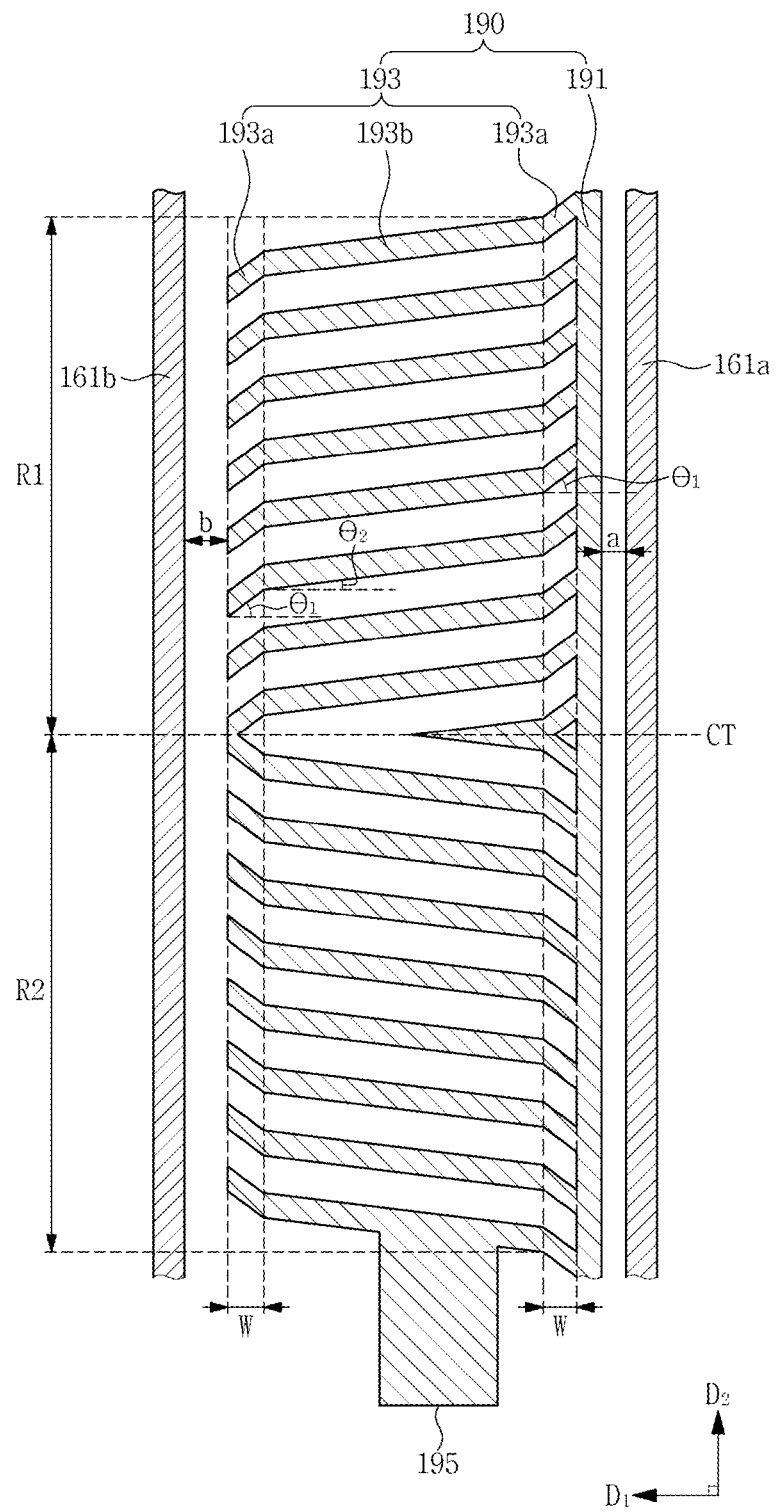
FIG. 4 is a plan view illustrating a data line and a second electric field generating electrode of an LCD device according to an exemplary embodiment.

FIG. 4 is a plan view illustrating the data lines 161a and 161b and the second electric field generating electrode 190 of the LCD device according to an exemplary embodiment.

Referring to FIG. 4, the second electric field generating electrode 190 includes the stem electrode 191 extending in a direction, for example, the second direction D2, the plurality of branch electrodes 193 extending from the stem electrode 191 while having a predetermined angle with respect to the first direction D1, and the connector 195 branched off from the branch electrode 193.

In an exemplary embodiment of an LCD device, the second electric field generating electrode 190 may include a single stem electrode 191 that extends in parallel to the data lines 161a and 161b. Accordingly, a disclination area in which liquid crystal molecules are not controlled by a horizontal electric field may be reduced, such that transmittance may be enhanced.

In such an embodiment, to further increase transmittance, an interval "a" between the stem electrode 191 and a data line 161a adjacent thereto may be asymmetric to an interval "b" between the branch electrode 193 and a data line 161b adjacent thereto.

In an exemplary embodiment, the interval "a" between the stem electrode 191 and the adjacent data line 161a may be less than the interval "b" between the branch electrode 193 and the adjacent data line 161b, such that the disclination area in which liquid crystal molecules are not controlled by a horizontal electric field may be substantially reduced, thereby effectively increasing the transmittance.

The branch electrodes 193 extend while having an oblique angle with respect to a direction parallel to the first direction D1. As used herein, the term "angle" refers to an acute angle rather than an obtuse angle.

Each of the branch electrodes 193 includes a pair of edge portions 193a at opposite ends thereof, respectively, and a center portion 193b between the pair of edge portions 193a.

A first angle $\theta_1$ formed between the edge portion 193a and an imaginary center line CT parallel to the first direction D1 may be greater than a second angle $\theta_2$ formed between the center portion 193b and the imaginary center line CT parallel to the first direction D1. The first angle $\theta_1$ may be in a range of about 15 degrees to about 30 degrees, and the second angle $\theta_2$ may be in a range of about 10 degrees to about 15 degrees.

A width "W" of the edge portion 193a in the first direction D1 may be equal to or greater than a minimum value of resolving power of a light exposure device used to form the second electric field generating electrode 190 and may be equal to or less than about 10 μm. In one exemplary embodiment, for example, the minimum value of resolving power of the light exposure device. may be equal to or greater than about 5 μm.

The edge portion 193a may reduce the formation of a texture in an edge portion of the second electric field generating electrode 190 because liquid crystal molecules are not controlled and are reverse-twisted in the edge portion 193a.

In such an embodiment, the second electric field generating electrode 190 may be divided into two or more domains based on an inclination direction, for example, an upward or downward direction, of the branch electrode 193 with respect to the first direction D1.

In one exemplary embodiment, for example, as illustrated in FIG. 4, the second electric field generating electrode 190 may be divided into a first domain R1 and a second domain R2 based on the imaginary center line CT. Branch electrodes 193 in the first domain R1 extend downwards to a direction opposite to the second direction D2, and branch electrodes 193 in the second domain R2 extend upwards to a direction of the second direction D2. In an exemplary embodiment, a shape of the second electric field generating electrode 190 may be symmetric with respect to the imaginary center line CT. In one exemplary embodiment, for example, the second electric field generating electrode 190 may have a shape with reflection symmetry, as shown in FIG. 4.

As the second electric field generating electrode 190 is divided into a plurality of domains to have various inclination directions of liquid crystal molecules, a viewing angle characteristic of the LCD device may be enhanced.

The connector 195 receives a data voltage from the drain electrode 165 through the contact hole 175 through which a portion of the drain electrode 165 is exposed.

Figure 5:
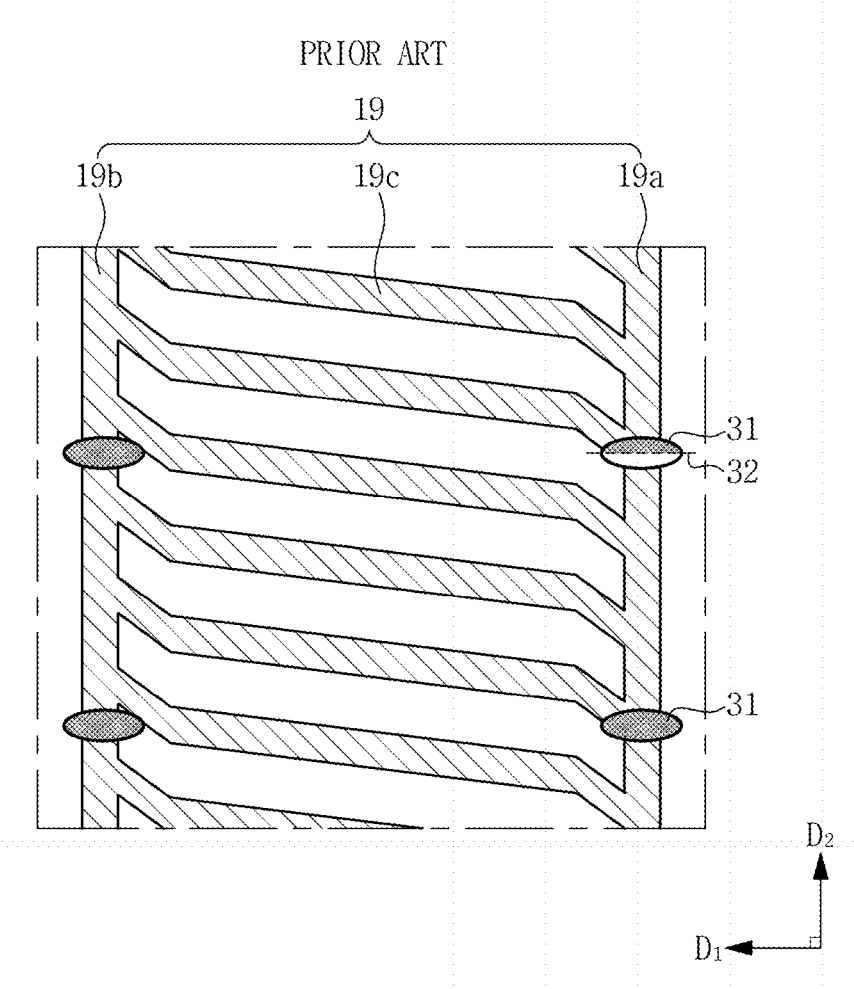
FIG. 5 is a plan view illustrating a portion of a second electric field generating electrode of a conventional an LCD device.
Figure 6:
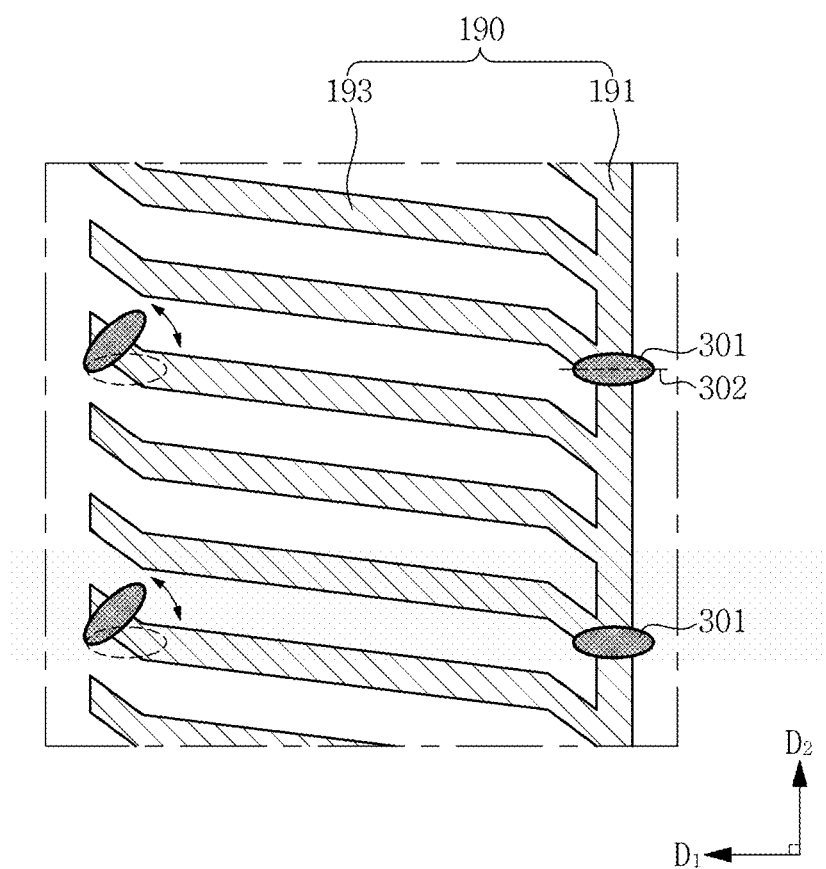
FIG. 6 is a plan view illustrating a portion of a second electric field generating electrode of an LCD device according to an exemplary embodiment.

FIG. 5 is a plan view illustrating a portion of a second electric field generating electrode 19 of a conventional LCD device. FIG. 6 is a plan view illustrating a portion of the second electric field generating electrode 190 of the LCD device according to an exemplary embodiment.

Referring to FIG. 5, the second electric field generating electrode 19 of a conventional LCD device may include a first stem electrode 19a and a second stem electrode 19b that extend in a second direction D2, and a plurality of branch electrodes 19c disposed between the first and second stem electrodes 19a and 19b and extending to have a predetermined angle with respect to a first direction D1.

In such a conventional LCD device, liquid crystal molecules 31 are initially aligned to have a major axis 32 parallel to the first direction D1, in a state in which an electric field is absent. With respect to the liquid crystal molecules 31 on the first and second stem electrodes 19a and 19b, an alignment direction of the liquid crystal molecules 31 and a direction in which electric fields are applied to the liquid crystal molecules 31 are the same as one another. Accordingly, the liquid crystal molecules 31 on the first and second stem electrodes 19a and 19b may not be twisted.

Accordingly, in such a conventional LCD device, the first and second stem electrodes 19a and 19b of the second electric field generating electrode 19 experience disclination occurring thereon in which the liquid crystal molecules 31 are not controlled. As a result, transmittance decreases.

Referring to FIG. 6, in an exemplary embodiment of the invention, the second electric field generating electrode 190 includes the stem electrode 191 extending in the second direction D2, and the plurality of branch electrodes 193 extending from the stem electrode 191 while having a predetermined angle with respect to the first direction D1.

In such an embodiment, the second electric field generating electrode 190 may reduce the disclination area in which the liquid crystal molecules 301 are not controlled, by omitting one of the first and second stem electrodes 19a and 19b according to the related art. As a result, transmittance increases.

In such an embodiment, the second electric field generating electrode 190 may further reduce the disclination area in which liquid crystal molecules 301 are not controlled, by omitting one of the first and second stem electrodes 19a and 19b according to the related art and by forming an interval between the remaining one of the first and second stem electrodes 19a and 19b and a data line adjacent thereto to be less than an interval between the branch electrodes 193 and a data line adjacent thereto. As a result, transmittance may significantly increase.

Figure 7:
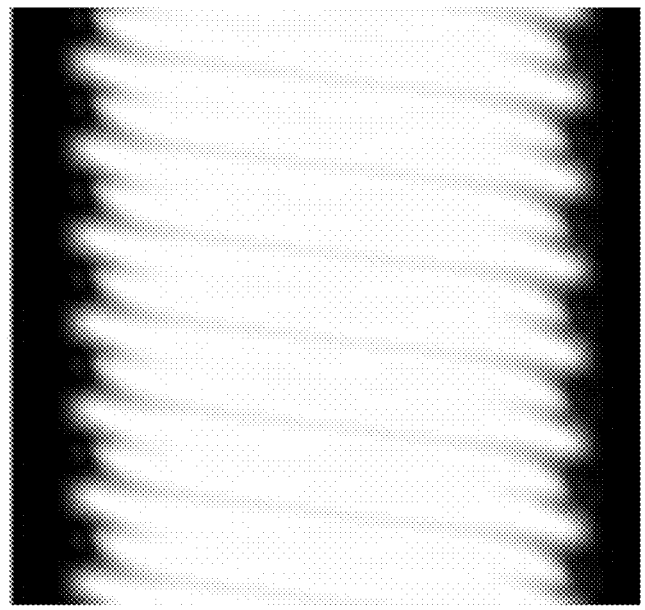
FIG. 7 is an electron-microscope image depicting the transmittance of a conventional an LCD device.
Figure 8:
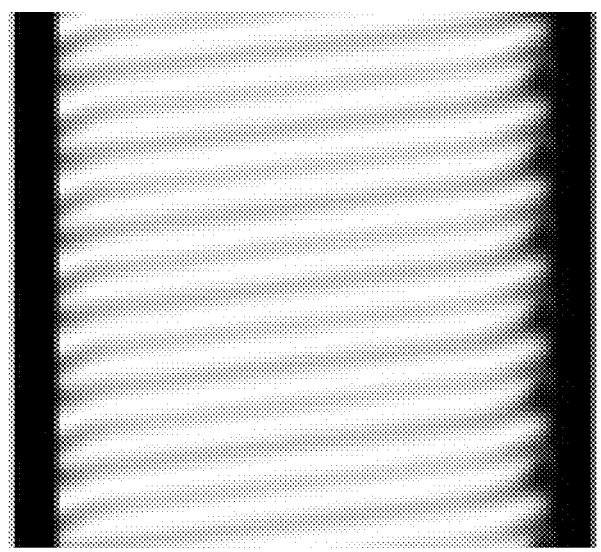
FIGS. 8 and 9 are electron-microscope images depicting the transmittance of an LCD device according to an exemplary embodiment.
Figure 9:

FIG. 7 is an electron-microscope image depicting the transmittance of a conventional LCD device. FIGS. 8 and 9 are electron-microscope images depicting the transmittance of the LCD device according to an exemplary embodiment.

FIGS. 7, 8, and 9 respectively illustrate simulation results of the transmittance of the LCD devices having the same aperture ratio, in a case of having a pair of stem electrodes, in a case of having a single stem electrode, and in a case in which an interval between a stem electrode and a data line adjacent thereto is formed to be less than an interval between a branch electrode and a data line adjacent thereto.

Referring to FIGS. 7 and 8, in an exemplary embodiment, where one of the stem electrodes is omitted, a disclination area in which liquid crystal molecules are not controlled is reduced, and accordingly, transmittance increases by about 8% when compared to that of a conventional LCD device.

Referring to FIGS. 7 and 9, in an alternative exemplary embodiment, the interval between the stem electrode, in which liquid crystal molecules are not controlled, and the data line is significantly reduced, and the interval between the branch electrode, in which liquid crystal molecules are controlled, and the data line is significantly increased, and accordingly, transmittance increases by about 11% when compared to that of a conventional LCD device.

As set forth above, according to exemplary embodiments of the invention, the LCD device may enhance transmittance by omitting one of the outer circumferential stem electrodes.

In such embodiments, the LCD device may enhance transmittance by forming an interval between the stem electrode and a data line adjacent to the stem electrode to be asymmetric to an interval between the branch electrode and a data line adjacent to the branch electrode.

In such embodiments, the LCD device may enhance transmittance by forming the interval between the stem electrode and the data line adjacent to the stem electrode to be less than the interval between the branch electrode and the data line adjacent to the branch electrode.

From the foregoing, it will be appreciated that various embodiments in accordance with the disclosure have been described herein for purposes of illustration, and that various modifications may be made without departing from the scope and spirit of the teachings. Accordingly, the various embodiments disclosed herein are not intended to be limiting of the true scope and spirit of the teachings. Various features of the above described and other embodiments can be mixed and matched in any manner, to produce further embodiments consistent with the invention.

What is claimed is:

1. A liquid crystal display device comprising:
   a first substrate;
   a second substrate opposite to the first substrate;
   a liquid crystal layer between the first substrate and the second substrate;
   a gate line on the first substrate, the gate line extends in a first direction;
   a data line on the first substrate, the data line extends in a second direction intersecting the first direction;
   a first electric field generating electrode on the first substrate; and
   a second electric field generating electrode on the first substrate, the second electric field generating electrode is insulated from the first electric field generating electrode,
   wherein the second electric field generating electrode comprises:
   a stem electrode extending in parallel to the data line; and
   branch electrodes extending from the stem electrode toward another data line contiguous to the data line and forming a predetermined angle with the gate line, and
   an interval between the stem electrode and the data line adjacent to the stem electrode is less than an interval between any other portion of the second electric field generating electrode and the data line and less than an interval between said any other portion of the second electric field generating electrode and the another data line.

2. The liquid crystal display device of claim 1, wherein the first electric field generating electrode is a planar electrode.

3. The liquid crystal display device of claim 1, wherein the branch electrode comprises a pair of edge portions at opposite ends of the branch electrode, respectively, and a center portion between the pair of edge portions.

4. The liquid crystal display device of claim 3, wherein a first angle formed between the pair of edge portions and the gate line is greater than a second angle formed between the center portion and the gate line.

5. The liquid crystal display device of claim 4, wherein the first angle is in a range of about 15 degrees to about 30 degrees.

6. The liquid crystal display device of claim 4, wherein the second angle is in a range of about 10 degrees to about 15 degrees.

7. The liquid crystal display device of claim 6, wherein the pair of edge portions have a width in a range of about 5 micrometers to about 10 micrometers.

8. The liquid crystal display device of claim 4, wherein a shape of the second electric field generating electrode is symmetric with respect to an imaginary center line parallel to the gate line.

9. The liquid crystal display device of claim 1, further comprising:
a thin film transistor connected to the gate line and the data line.

10. The liquid crystal display device of claim 9, wherein the second electric field generating electrode is connected to the thin film transistor.

11. The liquid crystal display device of claim 1, wherein the liquid crystal layer comprises liquid crystal molecules having a major axis initially aligned in parallel to the gate line.

12. A liquid crystal display device comprising:
a first substrate;
a second substrate opposite to the first substrate;
a liquid crystal layer between the first substrate and the second substrate;
a gate line on the first substrate, the gate line extends in a first direction;
first and second data lines on the first substrate, the first and second data lines extend in a second direction intersecting the first direction;
a first electric field generating electrode on the first substrate; and
a second electric field generating electrode on the first substrate between the first and second data lines, the second electric field generating electrode is insulated from the first electric field generating electrode,
wherein the second electric field generating electrode comprises:
a stem electrode extending in parallel to and adjacent to the first data line; and
branch electrodes extending from the stem electrode toward the second data line and forming a predetermined angle with the gate line, and
an interval between the stem electrode and the first data line is less than an interval between the branch electrodes and the second data line.

13. The liquid crystal display device of claim 12, wherein the branch electrodes are not disposed between the first data line and the stem electrode.

14. The liquid crystal display device of claim 12, wherein the first electric field generating electrode is a planar electrode.

15. The liquid crystal display device of claim 12, wherein the branch electrode comprises a pair of edge portions at opposite ends of the branch electrode, respectively, and a center portion between the pair of edge portions.

16. The liquid crystal display device of claim 15, wherein a first angle formed between the pair of edge portions and the gate line is greater than a second angle formed between the center portion and the gate line.

17. The liquid crystal display device of claim 16, wherein the first angle is in a range of about 15 degrees to about 30 degrees.

18. The liquid crystal display device of claim 16, wherein the second angle is in a range of about 10 degrees to about 15 degrees.

19. The liquid crystal display device of claim 18, wherein the pair of edge portions have a width in a range of about 5 micrometers to about 10 micrometers.

20. The liquid crystal display device of claim 16, wherein a shape of the second electric field generating electrode is symmetric with respect to an imaginary center line parallel to the gate line.

* * * * *